(12) United States Patent
Sharma et al.

(10) Patent No.: US 12,522,676 B2
(45) Date of Patent: Jan. 13, 2026

(54) POLYETHYLENE-BASED COMPOSITIONS AND FILMS MADE FROM SAME

(71) Applicant: Dow Global Technologies LLC, Midland, MI (US)

(72) Inventors: Rahul Sharma, Pearland, TX (US); Guihong Liao, Shanghai (CN); Martin Hill, Tarragona (ES); Jacquelyn A. Degroot, Sugarland, TX (US); Amit K. Chaudhary, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 423 days.

(21) Appl. No.: 17/997,285

(22) PCT Filed: Jun. 21, 2021

(86) PCT No.: PCT/US2021/038179
§ 371 (c)(1),
(2) Date: Oct. 27, 2022

(87) PCT Pub. No.: WO2022/015469
PCT Pub. Date: Jan. 20, 2022

(65) Prior Publication Data
US 2023/0167206 A1 Jun. 1, 2023

Related U.S. Application Data

(60) Provisional application No. 63/052,002, filed on Jul. 15, 2020.

(51) Int. Cl.
| | | |
|---|---|---|
| C08F 10/02 | (2006.01) | |
| B29C 48/00 | (2019.01) | |
| B29C 55/12 | (2006.01) | |
| C08G 77/04 | (2006.01) | |
| C08K 3/34 | (2006.01) | |
| C08K 5/20 | (2006.01) | |
| B29K 23/00 | (2006.01) | |
| B29K 83/00 | (2006.01) | |
| B29L 9/00 | (2006.01) | |
| B29L 31/00 | (2006.01) | |

(52) U.S. Cl.
CPC .......... *C08F 10/02* (2013.01); *B29C 48/0018* (2019.02); *B29C 48/022* (2019.02); *B29C 55/12* (2013.01); *C08G 77/04* (2013.01); *C08K 3/34* (2013.01); *C08K 5/20* (2013.01); *B29K 2023/0608* (2013.01); *B29K 2083/00* (2013.01); *B29L 2009/00* (2013.01); *B29L 2031/712* (2013.01)

(58) Field of Classification Search
CPC ....... C08L 83/04; C08L 23/04; C08L 23/0815
See application file for complete search history.

(56) References Cited

U.S. PATENT DOCUMENTS

| | | | |
|---|---|---|---|
| 2,992,201 | A | 7/1961 | Gober et al. |
| 6,472,077 | B1 | 10/2002 | Cretekos et al. |
| 2014/0299814 | A1 | 10/2014 | Bergen-Brenkman et al. |
| 2020/0199336 | A1 | 6/2020 | Ongayi et al. |

FOREIGN PATENT DOCUMENTS

| | | |
|---|---|---|
| CN | 111098557 | 5/2020 |
| EP | 3412455 | 12/2018 |
| WO | 1998046672 A3 | 1/1999 |
| WO | 2010149952 A2 | 12/2010 |
| WO | 201720808 A1 | 2/2017 |
| WO | 2018223357 A1 | 12/2018 |
| WO | 2018226585 A1 | 12/2018 |
| WO | 2018226591 A1 | 12/2018 |
| WO | 2018226620 A1 | 12/2018 |
| WO | 2020123520 A1 | 6/2020 |

OTHER PUBLICATIONS

Dow Corning HMB-6301 Masterbatch.

*Primary Examiner* — Mark S Kaucher
(74) *Attorney, Agent, or Firm* — Jacob R. Graham

(57) ABSTRACT

Embodiments of the present invention relate to polyethylene-based compositions, monolayer films, multilayer films, laminates, and articles. In one aspect, a polyethylene-based composition comprises (A) at least 95% by weight, based on the total weight of the polyethylene-based composition, of one or more polyethylenes; and (B) 250 to 15,000 ppm, based on the total weight of the polyethylene-based composition, of a polydimethylsiloxane having a number average molecular weight ($M_n$) of 1,000 to 40,000 g/mol, wherein the polyethylene-based composition has a density of 0.865 to 0.915 g/cm$^3$ and a melt index ($I_2$) of 0.5 to 25 g/10 minutes.

13 Claims, No Drawings

POLYETHYLENE-BASED COMPOSITIONS AND FILMS MADE FROM SAME

FIELD

This disclosure relates to polyethylene-based compositions, to films comprising such polyethylene-based compositions, and to laminates.

INTRODUCTION

Film layers formed from ethylene-based polymers are used in monolayer and multilayer films in a variety of applications, including, for example, food packaging and specialty packaging.

When polyethylene is used in one or more outer layers of a film, one has to be mindful of the potential for an outer surface of the film to adhere to other surfaces or itself. Thus, an outer surface of a polyethylene film typically requires a low coefficient of friction (COF) (e.g., less than 0.50) for efficient processing of the films, such as in a fabrication line or a packaging line.

Polyethylene plastomers/elastomers and other lower density polyethylenes commonly form a significant fraction of the sealant layer in high performance food packaging films. It is known that when such films are fabricated via a blown film process with polyethylene plastomer/elastomer as the inner layer of the bubble, the plastomer/elastomer layers come in contact as the bubble is collapsed and adhere to each other, making it difficult to separate the two layers (this problem is commonly referred to as "bubble blocking"). Moreover, the plastomer/elastomer layer of such films has a high COF, which makes it difficult to convert them into packages in vertical form fill and seal lines.

There remains a need for polyethylene-containing films that exhibit a low tendency to adhere to other surfaces (including themselves) and exhibit low coefficient of friction (COF). For example, there remains a need for polyethylene-containing films that contain a significant amount of polyethylene plastomers/elastomers in a sealant layer or other surface layer of the film and that exhibit a low tendency to adhere to other surfaces (including themselves) and exhibit low coefficient of friction (COF).

SUMMARY

The present invention provides polyethylene-based composition that incorporates certain polydimethylsiloxane (PDMS) additives with one or more polyethylenes to provide a composition having a lower density (e.g., 0.865 to 0.915 g/cm$^3$), such as polyethylene plastomers/elastomers. Such polyethylene-based compositions can be incorporated into a monolayer film or an outer layer of a multilayer film to achieve both low bubble blocking and low COF in some embodiments. Such monolayer or multilayer films can be incorporated in laminates and such laminates can exhibit low coefficients of friction against metal and/or other surfaces. In some embodiments, such polyethylene-based compositions can further comprise one or more fatty acid amides such as, for example, erucamide and/or behenamide.

In one embodiment, a polyethylene-based composition comprises (A) at least 95% by weight, based on the total weight of the polyethylene-based composition, of one or more polyethylenes; and (B) 250 to 15,000 ppm, based on the total weight of the polyethylene-based composition, of a polydimethylsiloxane having a number average molecular weight ($M_n$) of 1,000 to 40,000 g/mol, wherein the polyethylene-based composition has a density of 0.865 to 0.915 g/cm$^3$ and a melt index ($I_2$) of 0.5 to 25 g/10 minutes. In some embodiments, the polyethylene-based composition further comprises 250 to 2,500 ppm of erucamide and 250 to 2,500 ppm of behenamide, each based on the total weight of the polyethylene-based composition.

As discussed below, the present invention also provides monolayer films and multilayer films that comprise any of the inventive polyethylene-based compositions disclosed herein. In some embodiments, a monolayer film comprising an inventive polyethylene-based composition as described herein exhibits a coefficient of friction against itself and metal of less than 0.40. In some embodiments, a multilayer film comprises a sealant layer having an inventive polyethylene-based composition as described herein exhibits a coefficient of friction against itself and metal of less than 0.40.

As discussed below, the present invention also provides laminates formed from monolayer films or multilayer films as disclosed herein.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

Any reference to the Periodic Table of Elements is that as published by CRC Press, Inc., 1990-1991. Reference to a group of elements in this table is by the new notation for numbering groups.

The term "alkenyl" (or "alkenyl group") refers to an organic radical derived from an aliphatic hydrocarbon by removing one hydrogen atom from an alkene group. A nonlimiting example of an alkenyl group is a vinyl group. A "vinyl group" is a —CH=CH$_2$ group.

"Alkoxy" (or "alkoxy group") refers to the —OZ$^1$ radical, where representative Z$^1$ include alkyl, substituted alkyl, cycloalkyl, substituted cycloalkyl, heterocycloalkyl, substituted heterocycloalkyl, silyl groups and combinations thereof. Nonlimiting examples of suitable alkoxy radicals include methoxy, ethoxy, benzyloxy, and t-butoxy.

The term "alkyl" (or "alkyl group") refers to an organic radical derived from an aliphatic hydrocarbon by removing one hydrogen atom therefrom. An alkyl group may be a linear, branched, cyclic or a combination thereof. The term "substituted alkyl" refers to an alkyl, in which at least one hydrogen atom is substituted with a substituent that comprises at least one heteroatom. Heteroatoms include, but are not limited to, O, N, P and S. Substituents include, but are not limited to, halide, OR, NR'$_2$, PR'$_2$, P(=O)R'$_2$, SiR'$_3$; where each R' is independently a C$_1$-C$_{20}$ hydrocarbyl group.

The term "alkynyl" (or "alkynyl group") refers to an organic radical derived from an aliphatic hydrocarbon by removing one hydrogen atom from an alkyne group.

The term "aryl" (or "aryl group") refers to an organic radical derived from aromatic hydrocarbon by removing one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl, and the like. The term "substituted aryl" refers to an aryl, in which at least one hydrogen atom is substituted with a substituent comprising at least one heteroatom. Heteroatoms include, but are not limited to, O, N, P and S. Substituents include, but are not limited to, halide OR, NR'$_2$, PR'$_2$, P($=$O)R'$_2$, SiR'$_3$; where each R' is independently a $C_1$-$C_{20}$ hydrocarbyl group.

A "cycloalkyl" is a saturated cyclic non-aromatic hydrocarbon radical having a single ring or multiple condensed rings. Nonlimiting examples of suitable cycloalkyl radicals include cyclopentyl, cyclohexyl, cyclooctyl, bicyclooctyl, etc. In particular embodiments, cycloalkyls have between 3 and 200 carbon atoms, between 3 and 50 carbon atoms or between 3 and 20 carbon atoms.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers, ethylene/α-olefin interpolymers, and ethylene/α-olefin copolymers. Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); High Density Polyethylene (HDPE); Enhanced Polyethylene; polyethylene elastomers; and polyethylene plastomers. These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, bis-metallocene catalysts (sometimes referred to as "m-LLDPE"), constrained geometry catalysts (CGC), and molecular catalysts. Resins include linear, substantially linear, or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.940 g/cm$^3$. "MDPE" is typically made using chromium or Ziegler-Natta catalysts or using single-site catalysts including, but not limited to, bis-metallocene catalysts, constrained geometry catalysts, and molecular catalysts, and typically have a molecular weight distribution ("MWD") greater than 2.5.

The term "HDPE" refers to polyethylenes having densities greater than about 0.940 g/cm$^3$ and up to about 0.970 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

"Polyethylene plastomers/elastomers" are substantially linear, or linear, ethylene/α-olefin copolymers containing homogeneous short-chain branching distributions comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Polyethylene plastomers/elastomers have a density from 0.870 g/cm$^3$, or 0.880 g/cm$^3$, or 0.890 g/cm$^3$ to 0.900 g/cm$^3$, or 0.902 g/cm$^3$, or 0.904 g/cm$^3$, or 0.909 g/cm$^3$, or 0.910 g/cm$^3$. Nonlimiting examples of polyethylene plastomers/elastomers include AFFINITY™ plastomers and elastomers (available from The Dow Chemical Company), EXACT Plastomers (available from ExxonMobil Chemical), Tafmer (available from Mitsui), Nexlene™ (available from SK Chemicals Co.), and Lucene (available LG Chem Ltd.).

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

In one embodiment, a polyethylene-based composition of the present invention comprises (A) at least 95% by weight, based on the total weight of the polyethylene-based composition, of one or more polyethylenes; and (B) 250 to 15,000 ppm, based on the total weight of the polyethylene-based composition, of a polydimethylsiloxane having a number average molecular weight ($M_n$) of 1,000 to 40,000 g/mol, wherein the polyethylene-based composition has a density of 0.865 to 0.915 g/cm$^3$ and a melt index ($I_2$) of 0.5 to 25 g/10 minutes. In some embodiments, the polydimethylsiloxane has a number average molecular weight ($M_n$) of 1,000 to 2,500 g/mol. In some embodiments, the polyethylene-based composition further comprises 250 to 2,500 ppm of a primary unsaturated fatty acid amide (e.g., erucamide) and 250 to 2,500 ppm of a linear saturated fatty acid amide (e.g., behenamide), each based on the total weight of the polyethylene-based composition. The one or more polyethylenes, in some embodiments of the polyethylene-based compositions, include a polyethylene having a density of 0.885 to 0.910 g/cm$^3$ and a melt index ($I_2$) of 0.5 to 25 g/10 minutes. The polyethylene-based composition, in some embodiments, further comprises up to 20,000 ppm of an inorganic antiblocking agent, based on the total weight of the polyethylene-based composition. In some embodiments, the polyethylene-based composition further comprises up to 5,000 ppm of a fatty acid amide selected from the group consisting of stearamide, oleamide, palmitamide, isostearamide, ethylene-bis-oleamide, and ethylene-bis-stearamide and combinations thereof. The polyethylene-based composition, in some embodiments, further comprises 250 to 15,000 ppm, based on the total weight of the polyethylene-based composition, of a polydimethylsiloxane having a number average molecular weight ($M_n$) of greater than 40,000 g/mol. As discussed further herein, the polyethylene-based composition may optionally include common additive species familiar to those skilled in the art to achieve additional functional performance such as antioxidants, anti-fogging agents, anti-static agents, processing aids, nucleating agents etc.

The present invention also relates to monolayer films. The monolayer films, in various embodiments, comprise any one of the inventive polyethylene-based compositions disclosed herein. In some embodiments, the monolayer film exhibits a coefficient of friction against itself and metal of less than 0.40. Some embodiments of the present invention relate to laminates that comprise a monolayer film comprising any one of the inventive polyethylene-based compositions disclosed herein. In some embodiments, the monolayer film side of the laminate exhibits a coefficient of friction against metal of less than 0.50.

The present invention also relates to multilayer films. The multilayer films, in various embodiments, comprise any one of the inventive polyethylene-based compositions disclosed herein. In some embodiments, a sealant layer of the multilayer film comprises the polyethylene-based composition, and the sealant layer exhibits a coefficient of friction against itself and metal of less than 0.40. In some embodiments, an inner layer of the multilayer film comprises the inventive polyethylene-based composition. Some embodiments of the present invention relate to oriented multilayer films comprising a sealant layer, wherein the sealant layer comprises the inventive polyethylene-based composition. In such embodiments, the multilayer films can be machine direction oriented or biaxially oriented.

Some embodiments of the present invention relate to laminates that comprise a multilayer film comprising any one of the inventive polyethylene-based compositions disclosed herein. In some embodiments of laminates, a sealant layer of the multilayer film comprises the polyethylene-based composition, the sealant layer is an outer layer of the laminate, and the sealant layer of the multilayer film exhibits a coefficient of friction against metal of less than 0.50. In some embodiments, the multilayer film in the laminate is laminated to a second film, and the second film is a biaxially oriented film, or a second film oriented in the machine direction, and wherein the second film comprises at least 95% by weight, based on the total weight of the second film, of one or more polyethylenes. The second film can be a monolayer film or a multilayer film. In some embodiments, the multilayer film in the laminate is laminated to a second film, wherein the second film comprises materials other than polyethylene such as polypropylene, polyethylene terephthalate and polyamides. In some embodiments, the sealant side of the laminate exhibits a coefficient of friction against metal of less than 0.50.

Polyethylene-Based Compositions

The present disclosure provides polyethylene-based compositions. In one embodiment, the polyethylene-based composition comprises (A) at least 95% by weight, based on the total weight of the polyethylene-based composition, of one or more polyethylenes; and (B) 250 to 15,000 ppm, based on the total weight of the polyethylene-based composition, of a polydimethylsiloxane having a number average molecular weight (Me) of 1,000 to 40,000 g/mol, wherein the polyethylene-based composition has a density of 0.865 to 0.915 g/cm$^3$ and a melt index ($I_2$) of 0.5 to 25 g/10 minutes.

A. Polyethylene

The composition contains at least 95% by weight of one or more polyethylenes. Such polyethylenes are selected so as to provide the polyethylene-based composition with a density of 0.865 to 0.915 g/cm$^3$ and a melt index ($I_2$) of 0.5 to 25 g/10 minutes. In some embodiments, the one or more polyethylenes each have a density of 0.885 to 0.910 g/cm$^3$ and a melt index ($I_2$) of 0.5 to 25 g/10 minutes.

Nonlimiting examples of suitable ethylene-based polymer include polyethylene plastomers/elastomers, low density polyethylene (LDPE), linear low density polyethylene (LLDPE), ultra low density polyethylene (ULDPE), very low density polyethylene (VLDPE), enhanced polyethylene, and ethylene/α-olefin multi-block copolymers (also known as olefin block copolymer (OBC)).

In some embodiments, the one or more polyethylenes include a polyethylene plastomer/elastomer. The polyethylene plastomer/elastomer is an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer and optional additives. In an embodiment, the polyethylene plastomer/elastomer is an ethylene/$C_4$-$C_8$ α-olefin copolymer having one, some, or all of the following properties:
  (a) a density from 0.865 c/cc, or 0.870 g/cc, or 0.880 g/cc, or 0.885 g/cc, or 0.890 g/cc to 0.900 g/cc, or 0.902 g/cc, or 0.904 g/cc, or 0.909 g/cc, or 0.910 g/cc, or 0.915 g/cc; and/or
  (b) a melt index from a melt index from 0.5 g/10 min, or 1 g/10 min to 1.5 g/10 min, or 2.0 g/10 min, or 3.0 g/10 min, or 5.0 g/10 min, or 6.0 g/10 min, or 8.0 g/10 min, or 10 g/10 min, or 15 g/10 min, or 20 g/10 min, or 25 g/10 min; and/or
  (c) a melting point (Tm) from 40° C., or 45° C., or 50° C., or 55° C., or 60° C., or 65° C., or 70° C., or 75° C. to 80° C., or 85° C., or 90° C., or 95° C., or 100° C., or 105° C., or 110° C., or 115° C., or 120° C.

In some embodiments, the polyethylene plastomer/elastomer has a density of 0.885 to 0.910 g/cm³ and a melt index ($I_2$) of 0.5 to 25 g/10 minutes.

In an embodiment, the polyethylene plastomer/elastomer is an ethylene/1-octene copolymer with a density of 0.902 g/cc, a melt index of 1.0 g/10 min, and a melting point of 99° C. In a further embodiment, the ethylene plastomer/elastomer is AFFINITY™ PL 1880G, available from The Dow Chemical Company.

In some embodiments, the one or more polyethylenes include a low density polyethylene (LDPE). The LDPE can be an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. The LDPE has one or both of the following properties:
  (a) a density from 0.915 g/cc, or 0.920 g/cc, or 0.925 g/cc to 0.930 g/cc, or 0.935 g/cc, or 0.940 g/cc; and/or
  (b) a melt index from a melt index from 0.5 g/10 min, or 1 g/10 min, or 1.5 g/10 min, or 2.0 g/10 min to 3.0 g/10 min, or 5.0 g/10 min, or 6.0 g/10 min, or 8.0 g/10 min, or 10 g/10 min, or 15 g/10 min, or 20 g/10 min, or 25 g/10 min.

The polyethylene-based composition may contain more than one polyethylene. In some embodiments, the polyethylene-based composition includes at least two polyethylenes, wherein each polyethylene differs from one another compositionally, structurally, and/or physically. In one embodiment, the polyethylene-based composition comprises a polyethylene plastomer/elastomer and a LDPE.

The polyethylene-based composition comprises at least 95% by weight of the one or more polyethylenes. In some embodiments, the polyethylene-based composition contains from 95 wt %, or 96 wt %, or 97 wt %, or 98 wt %, or 99 wt %, or 99.9 wt % polyethylene, based on the total weight of the polyethylene-based composition.

The one or more polyethylenes may comprise two or more embodiments discussed herein.

B. Polydimethylsiloxane

The polyethylene-based composition further comprises 250 to 15,000 ppm, based on the total weight of the polyethylene-based composition, of a polydimethylsiloxane having a number average molecular weight ($M_n$) of 1,000 to 40,000 g/mol. "Polydimethylsiloxane" ("PDMS") is a polymeric organosilicon compound with the following general Structure (I):

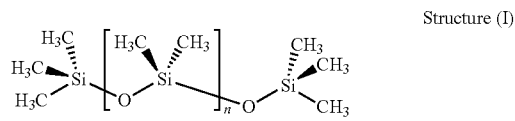

Structure (I)

wherein n is the number of repeating monomer [$SiO(CH_3)_2$] units and n is greater than or equal to 2, or from 2 to 20,000. The PDMS may be unsubstituted or substituted. A "substituted PDMS" is a PDMS in which at least one methyl group of Structure (I) is substituted with a substituent. Non-limiting examples of substituents include halogen atoms (such as chlorine, fluorine, bromine, and iodine); halogen atom-containing groups (such as chloromethyl groups, perfluorobutyl groups, trifluoroethyl groups, and nonafluorohexyl groups); oxygen atom-containing groups (such as hydroxy groups, alkoxy groups (such as methoxy groups and ethoxy groups), (meth)acrylic epoxy groups, and carboxyl groups); nitrogen atom-containing groups (such as amino-functional groups, amido-functional groups, and cyano-functional groups); sulphur atom-containing groups (such as mercapto groups); hydrogen; $C_2$-$C_{10}$ alkyl groups (such as an ethyl group); $C_2$-$C_{10}$ alkynyl groups; alkenyl groups (such as vinyl groups and hexenyl groups); aryl groups (such as phenyl groups and substituted phenyl groups); cycloalkyl groups (such as cyclohexane groups); and combinations thereof. The substituted methyl group may be a terminal methyl group or a non-terminal methyl group. Non-limiting examples of suitable substituted PDMS include trialkylsilyl terminated PDMS wherein at least one alkyl is a $C_2$-$C_{10}$ alkyl; dialkylhydroxysilyl terminated PDMS; dialkylhydrogensilyl terminated PDMS; dialkylalkenyl silyl terminated PDMS; and dialkylvinylsilyl terminated PDMS. In an embodiment, the substituted PDMS is a dimethylhydroxysilyl terminated PDMS. In another embodiment, the substituted PDMS is a dimethylvinylsilyl terminated PDMS.

In an embodiment, the substituted PDMS excludes nitrogen atom-containing groups. In another embodiment, the substituted PDMS excludes epoxy substituent groups.

In an embodiment, the PDMS is unsubstituted. An "unsubstituted PDMS" is the PDMS of Structure (I) wherein no methyl group in Structure (I) is substituted with a substituent. In an embodiment, the unsubstituted PDMS is a trimethylsilyl terminated PDMS.

The polyethylene-based composition comprises 250 to 15,000 ppm, based on the total weight of the polyethylene-based composition, of a polydimethylsiloxane having a number average molecular weight ($M_n$) of 1,000 to 40,000 g/mol. In some embodiments, the PDMS has a number average molecular weight ($M_n$) from 1,000 to 1,500 g/mol or 1,500 to 2,500 g/mol, or 2,500 to 5,000 g/mol, or 5,000 to 10,000 g/mol, or 10,000 to 15,000 g/mol, or 15,000 to 20,000 g/mol, or 20,000 to 25,000 g/mol, or 25,000 to 30,000 g/mol, or 30,000 to 35,000 g/mol, or 35,000 to 40,000 g/mol.

In some embodiments, the PDMS has a weight average molecular weight ($M_w$) from 1,250 to 1,750 g/mol or 1,750 to 3,250 g/mol, or 3,250 to 6,000 g/mol, or 6,000 to 15,000 g/mol, or 15,000 to 25,000 g/mol, or 25,000 to 35,000 g/mol, or 35,000 to 45,000 g/mol, or 45,000 to 55,000 g/mol, or 55,000 to 65,000 g/mol, or 65,000 to 75,000 g/mol, or 75,000 to 90,000 g/mol.

In some embodiments, the PDMS has a molecular weight distribution (Man) from 1.0 to 3.0, or 1.0, or 1.2, or 1.3, or 1.4, or 1.5, or 1.6, or 1.7, or 1.8, or 1.9, or 2.0, or 2.1, or 2.2, or 2.3 to 2.5, or 2.5 to 2.7, or 2.7 3.0.

In some embodiments, the PDMS has the Structure (I) and n is from 10 to 550, or 10, or 15, or 20, or 25, or 30, or 35, or 40, 45, or 50, or 60, or 70, or 80, or 82, or 90, 110, or, 130, or 150, or 170, or 200, 250, or 300, or 350, or 400, to 450, or 500, or 550.

In some embodiments, the PDMS is an unsubstituted PDMS. In some embodiments, the PDMS (such as an unsubstituted PDMS) has a number average molecular weight ($M_n$) from 1,000 g/mol to 40,000 g/mol; and the PDMS has one, some, or all of the following properties:
  (a) a weight average molecular weight (Mw) from 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 150,000 g/mol; and/or
  (b) a molecular weight distribution (Mw/Mn) from 2.2, or 2.3, or 2.4 to 2.5, or 2.6; and/or
  (c) the low Mn PDMS has the Structure (I) and n is from 2, or 5, or 10, or 50, or 100, or 150, or 200, or 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, to 3500, or 4000, or 4500.

The polyethylene-based compositions may contain more than one of such PDMS having a $M_n$ from 1,000 to 40,000 g/mol, or, in some embodiments, from 1,000 to less than 30,000 g/mol.

The PDMS having a number average molecular weight ($M_n$) of 1,000 to 40,000 g/mol, or 1,000 to 30,000 g/mol, may comprise two or more embodiments discussed herein.

In some embodiments, polyethylene-based compositions may further comprise 250 to 15,000 ppm, based on the total weight of the polyethylene-based composition, of a polydimethylsiloxane having a number average molecular weight ($M_n$) of greater than 40,000 g/mol (a "higher $M_n$ PDMS"). In some embodiments, the higher $M_n$ PDMS has a number average molecular weight (Mn) from greater than 40,000 g/mol to less than 500,000 g/mol.

In some embodiments, the higher $M_n$ PDMS has a number average molecular weight ($M_n$) from 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 300,000 g/mol, or 350,000 g/mol, to 400,000 g/mol, or 450,000 g/mol, or less than 500,000 g/mol.

In some embodiments, the higher $M_n$ PDMS has a number average molecular weight ($M_n$) from 40,000 g/mol, or 45,000 g/mol, or 50,000 g/mol, or 55,000 g/mol, or 60,000 g/mol, or 65,000 g/mol, to 70,000 g/mol, or 75,000 g/mol, or less than 80,000 g/mol.

In some embodiments, the higher $M_n$ PDMS has a weight average molecular weight ($M_w$) from 40,000 g/mol, or 50,000 g/mol, or 60,000 g/mol, or 70,000 g/mol, or 80,000 g/mol, or 90,000 g/mol, or 100,000 g/mol, or 110,000 g/mol, or 120,000 g/mol, or 150,000 g/mol, or 200,000 g/mol, or 250,000 g/mol to 300,000 g/mol, or 400,000 g/mol, or 500,000 g/mol, or 600,000 g/mol, to 700,000 g/mol, or 900,000 g/mol, or less than 1,100,000 g/mol.

In some embodiments, the higher $M_n$ PDMS has a molecular weight distribution ($M_w/M_n$) from 1.0, or 1.5, or 2.0, or 2.1, or 2.2, or 2.3, or 2.4 to 2.5, or 2.6, or 2.7, or 2.8, or 2.9, to 3.0, or 3.5.

In some embodiments, the higher $M_n$ PDMS has the Structure (I) and n is from 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4500, or 5000, or 5500, to 6000, or 6500, or 7000.

In some embodiments, the higher $M_n$ PDMS is an unsubstituted PDMS. In some embodiments, the higher $M_n$ PDMS (such as an unsubstituted PDMS) has a number average molecular weight ($M_n$) from 40,000 g/mol, or 45,000 g/mol, or 48,000 g/mol to 49,000 g/mol, or 50,000 g/mol; and the higher $M_n$ PDMS has one, some, or all of the following properties:
  (a) a weight average molecular weight ($M_w$) from 40,000 g/mol, or 50,000 g/mol, or 60,000 g/mol, or 70,000 g/mol, or 80,000 g/mol, or 90,000 g/mol, or 100,000 g/mol, or 110,000 g/mol, or 120,000 g/mol, or 150,000 g/mol, or 200,000 g/mol, or 250,000 g/mol to 300,000 g/mol, or 400,000 g/mol, or 500,000 g/mol, or 600,000 g/mol, to 700,000 g/mol, or 900,000 g/mol, or less than 1,100,000 g/mol; and/or
  (b) a molecular weight distribution (Mw/Mn) from 1.0, or 1.5, or 2.0, or 2.1, or 2.2, or 2.3, or 2.4 to 2.5, or 2.6, or 2.7, or 2.8, or 2.9, to 3.0, or 3.5; and/or
  (c) the higher $M_n$ PDMS has the Structure (I) and n is from 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4500, or 5000, or 5500, to 6000, or 6500, or 7000.

The polyethylene-based compositions, in some embodiments, may contain more than one higher $M_n$ PDMS.

The higher $M_n$ PDMS may comprise two or more embodiments of higher $M_n$ as discussed herein.

C. Other Additives

The polyethylene-based compositions may further comprise other additives as discussed further herein. In particular, in some embodiments, the inclusion of at least one unsaturated primary fatty acid amide (e.g., erucamide) and at least one linear saturated primary fatty acid amide (e.g., behenamide) in the polyethylene-based compositions have proven beneficial.

In some embodiments, the polyethylene-based composition comprises an unsaturated primary fatty acid amide having a melting point of 100° C. or less. An "unsaturated primary fatty acid amide" is a molecule having the Structure (II):

Structure (II)

wherein R is a $C_3$ to $C_{24}$ alkyl moiety that is mono-unsaturated or poly-unsaturated. In an embodiment, R is a $C_{11}$ to $C_{24}$, or a $C_{15}$ to $C_{23}$ alkyl moiety, or a $C_{17}$ to $C_{21}$ alkyl moiety that is mono-unsaturated or poly-unsaturated. A "mono-unsaturated" alky moiety is an alkyl that has one double bond (a C=C bond), with all of the remainder carbon atoms being linked via single bonds (C—C bonds). A "poly-unsaturated" alky moiety is an alkyl that has at least two double bonds (C=C bonds). In an embodiment, R is selected from a $C_{17}$ alkyl moiety and a $C_{21}$ alkyl moiety that is mono-unsaturated or poly-unsaturated. In an embodiment, R is mono-unsaturated. Nonlimiting examples of suitable unsaturated primary fatty acid amides include erucamide, oleamide, and combinations thereof. In some embodiments, the polyethylene-based composition comprises up to 5,000 ppm of an unsaturated fatty acid amide selected from the group consisting of erucamide and oleamide. In some embodiments, a polyethylene-based composition comprises up to 2,500 ppm of an unsaturated primary fatty acid amide such as erucamide and oleamide.

In some embodiments, a polyethylene-based composition further comprises 250 to 2,500 ppm of erucamide, based on the total weight of the polyethylene-based composition. A polyethylene-based composition, in some embodiments, further comprises 1,000 to 2,000 ppm of erucamide, based on the total weight of the polyethylene-based composition. A polyethylene-based composition further comprises 1,250 to 1,750 ppm of erucamide, based on the total weight of the polyethylene-based composition in some embodiments.

In embodiments wherein the polyethylene-based composition comprises a linear saturated fatty acid amide, the saturated primary fatty acid amide can have a melting point greater than 100° C. A "saturated primary fatty acid amide" is a molecule having the Structure (III):

Structure (III)

wherein $R^1$ is a $C_3$ to $C_{27}$ alkyl moiety that is saturated. In an embodiment, $R^1$ is a $C_{11}$ to $C_{25}$, or a $C_{15}$ to $C_{23}$ alkyl moiety, or a $C_{15}$ to $C_{21}$ alkyl moiety that is saturated. A "saturated" alkyl moiety is an alkyl in which all carbon atoms are linked to one another via single bonds (C—C bonds). In other words, a saturated alkyl moiety excludes carbon atoms linked via double bonds (C=C bonds). In an embodiment, $R^1$ is selected from a $C_{17}$ alkyl moiety and a $C_{21}$ alkyl moiety that is saturated. A "linear saturated primary fatty acid amide", $R^1$ is linear (unbranched). Nonlimiting examples of suitable saturated primary fatty acid amides include behenamide, palmitamide, stearamide, isostearamide, ethylene-bis-oleamide, and combinations thereof.

In some embodiments, the saturated primary fatty acid amide of the Structure (IV), $R^1$ is a $C_{21}$ alkyl moiety that is saturated. In a further embodiment, the saturated primary fatty acid amide is behenamide, for which $R^1$ is a linear $C_{21}$ alkyl moiety.

In some embodiments, a polyethylene-based composition comprises 250 to 2,500 ppm of erucamide and 250 to 2,500 ppm of behenamide, based on the total weight of the polyethylene-based composition. A polyethylene-based composition, in some embodiments, comprises 1,000 to 2,000 ppm of erucamide and 1,000 to 2,000 ppm of behenamide, based on the total weight of the polyethylene-based composition. A polyethylene-based composition further comprises 1,250 to 1,750 ppm of behenamide, based on the total weight of the polyethylene-based composition in some embodiments.

In some embodiments, a polyethylene-based composition further comprises up to 5,000 ppm of an additional fatty acid amide (in addition to erucamide and behenamide) selected from the group consisting of stearamide, oleamide, palmitamide, isostearamide, ethylene-bis-oleamide, and ethylene-bis-stearamide and combinations thereof.

In some embodiments wherein the polyethylene-based composition comprises 250 to 2,500 ppm of erucamide and 250 to 2,500 ppm of behenamide, the composition may further comprise up to 5,000 ppm of a fatty acid amide selected from the group consisting of stearamide, oleamide, palmitamide, isostearamide, ethylene-bis-oleamide, and ethylene-bis-stearamide and combinations thereof.

In some embodiments, a polyethylene-based composition may further comprise an inorganic antiblocking agent. An "antiblocking agent" is a compound that minimizes, or prevents, blocking (i.e., adhesion) between two adjacent layers of film by creating a microscopic roughening of the film layer surface, which reduces the available contact area between adjacent layers. Non-limiting examples of suitable inorganic antiblocking agents include silica, talc, and combinations thereof. In such embodiments, a polyethyelene-based composition may comprise up to 20,000 ppm of the inorganic blocking agent, based on the total weight of the polyethylene-based composition. In some embodiments, the polyethylene-based composition comprises 250 ppm to 20,000 ppm of inorganic blocking agent (e.g., silica and/or talc) based on the total weight of the polyethylene-based composition.

In some embodiments, a composition may include one or more other additives. Non-limiting examples of suitable other additives include antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

In some embodiments, a polyethylene-based composition comprises, consists essentially of, or consists of:
(A) at least 95% by weight, based on the total weight of the polyethylene-based composition, of one or more polyethylenes; and
(B) 250 to 15,000 ppm, based on the total weight of the polyethylene-based composition, of a polydimethylsiloxane having a number average molecular weight ($M_n$) of 1,000 to 40,000 g/mol, wherein the polyethylene-based composition has a density of 0.865 to 0.915 g/cm$^3$ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes; and
(B) 250 to 15,000 ppm, based on the total weight of the polyethylene-based composition, of a polydimethylsiloxane having a number average molecular weight ($M_n$) of 1,000 to 2,500 g/mol, wherein the polyethylene-based composition has a density of 0.865 to 0.915 g/cm$^3$ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes; and
(B) 250 to 15,000 ppm, based on the total weight of the polyethylene-based composition, of a polydimethylsiloxane having a number average molecular weight ($M_n$) of 1,000 to less than 30,000 g/mol, wherein the polyethylene-based composition has a density of 0.865 to 0.915 g/cm³ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes, wherein the one or more polyethylenes include a polyethylene plastomer/elastomer; and
(B) 250 to 15,000 ppm, based on the total weight of the polyethylene-based composition, of a polydimethylsiloxane having a number average molecular weight ($M_n$) of 1,000 to less than 40,000 g/mol, wherein the polyethylene-based composition has a density of 0.865 to 0.915 g/cm³ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes having a density of 0.865 to 0.915 g/cm³ and a melt index ($I_2$) of 0.5 to 25 g/10 minutes; and
(B) 250 to 15,000 ppm, based on the total weight of the polyethylene-based composition, of a polydimethylsiloxane having a number average molecular weight ($M_n$) of 1,000 to less than 40,000 g/mol, wherein the polyethylene-based composition has a density of 0.865 to 0.915 g/cm³ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes having a density of 0.885 to 0.910 g/cm³ and a melt index ($I_2$) of 0.5 to 25 g/10 minutes; and
(B) 250 to 15,000 ppm, based on the total weight of the polyethylene-based composition, of a polydimethylsiloxane having a number average molecular weight ($M_n$) of 1,000 to less than 40,000 g/mol, wherein the polyethylene-based composition has a density of 0.865 to 0.915 g/cm³ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes having a density of 0.885 to 0.910 g/cm³ and a melt index ($I_2$) of 0.5 to 25 g/10 minutes; and
(B) 250 to 15,000 ppm, based on the total weight of the polyethylene-based composition, of a polydimethylsiloxane having a number average molecular weight ($M_n$) of 1,000 to less than 30,000 g/mol, wherein the polyethylene-based composition has a density of 0.865 to 0.915 g/cm³ and a melt index ($I_2$) of 0.5 to 25 g/10 minutes.

In some embodiments, a polyethylene-based composition comprises, consists essentially of, or consists of:
(A) at least 95% by weight, based on the total weight of the polyethylene-based composition, of one or more polyethylenes;
(B) 250 to 15,000 ppm, based on the total weight of the polyethylene-based composition, of a polydimethylsiloxane having a number average molecular weight ($M_n$) of 1,000 to less than 40,000 g/mol;
(C) 250 to 2,500 ppm of erucamide; and
(D) 250 to 2,500 ppm of behenamide, wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

In some embodiments, a polyethylene-based composition comprises, consists essentially of, or consists of:
(A) at least 95% by weight, based on the total weight of the polyethylene-based composition, of one or more polyethylenes, wherein the one or more polyethylenes include a polyethylene plastomer/elastomer;
(B) 250 to 15,000 ppm, based on the total weight of the polyethylene-based composition, of a polydimethylsiloxane having a number average molecular weight ($M_n$) of 1,000 to less than 40,000 g/mol;
(C) 250 to 2,500 ppm of erucamide; and
(D) 250 to 2,500 ppm of behenamide, wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

In some embodiments, a polyethylene-based composition comprises, consists essentially of, or consists of:
(A) at least 95% by weight, based on the total weight of the polyethylene-based composition, of one or more polyethylenes having a density of 0.865 to 0.915 g/cm³ and a melt index ($I_2$) of 0.5 to 25 g/10 minutes;
(B) 250 to 15,000 ppm, based on the total weight of the polyethylene-based composition, of a polydimethylsiloxane having a number average molecular weight ($M_n$) of 1,000 to less than 40,000 g/mol, wherein the polyethylene-based composition has a density of 0.865 to 0.915 g/cm³ and a melt index ($I_2$) of 0.5 to 25 g/10 minutes;
(C) 250 to 2,500 ppm of erucamide; and
(D) 250 to 2,500 ppm of behenamide, wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

In some embodiments, a polyethylene-based composition comprises, consists essentially of, or consists of:
(A) at least 95% by weight, based on the total weight of the polyethylene-based composition, of one or more polyethylenes having a density of 0.885 to 0.910 g/cm³ and a melt index ($I_2$) of 0.5 to 25 g/10 minutes;
(B) 250 to 15,000 ppm, based on the total weight of the polyethylene-based composition, of a polydimethylsiloxane having a number average molecular weight ($M_n$) of 1,000 to less than 40,000 g/mol;
(C) 250 to 2,500 ppm of erucamide; and
(D) 250 to 2,500 ppm of behenamide, wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

In some embodiments, a polyethylene-based composition comprises, consists essentially of, or consists of:
(A) at least 95% by weight, based on the total weight of the polyethylene-based composition, of one or more polyethylenes;
(B) 250 to 15,000 ppm, based on the total weight of the polyethylene-based composition, of a polydimethylsiloxane having a number average molecular weight ($M_n$) of 1,000 to less than 40,000 g/mol;
(C) 250 to 20,000 ppm of an inorganic antiblocking comprising silica and/or talc;
(D) 250 to 2,500 ppm of erucamide; and
(E) 250 to 2,500 ppm of behenamide,
wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

In some embodiments, a polyethylene-based composition comprises, consists essentially of, or consists of:
(A) at least 95% by weight, based on the total weight of the polyethylene-based composition, of one or more polyethylenes;
(B) 250 to 15,000 ppm, based on the total weight of the polyethylene-based composition, of a polydimethylsiloxane having a number average molecular weight ($M_n$) of 1,000 to less than 40,000 g/mol;
(C) 250 to 15,000 ppm, based on the total weight of the polyethylene-based composition, of a polydimethylsiloxane having a number average molecular weight ($M_n$) of greater than 40,000 g/mol up to 500,000 g/mol;
(D) 250 to 2,500 ppm of erucamide; and
(E) 250 to 2,500 ppm of behenamide,
wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

In some embodiments, a polyethylene-based composition comprises, consists essentially of, or consists of:
(A) at least 95% by weight, based on the total weight of the polyethylene-based composition, of one or more polyethylenes;
(B) 250 to 15,000 ppm, based on the total weight of the polyethylene-based composition, of a polydimethylsiloxane having a number average molecular weight ($M_n$) of 1,000 to less than 40,000 g/mol;
(C) 250 to 15,000 ppm, based on the total weight of the polyethylene-based composition, of a polydimethylsiloxane having a number average molecular weight ($M_n$) of greater than 40,000 g/mol up to 500,000 g/mol;
(D) 250 to 20,000 ppm of an inorganic antiblocking comprising silica and/or talc;
(E) 250 to 2,500 ppm of erucamide; and
(F) 250 to 2,500 ppm of behenamide,
wherein the polyethylene-based composition has a density of 0.865 to 0.915 g/cm³ and a melt index ($I_2$) of 0.5 to 25 g/10 minutes. In some embodiments, the polyethylene-based composition comprises 1,000 to 2,000 ppm of erucamide and 1,000 to 2,000 ppm of behenamide.

Films

In some embodiments, the present invention relates to a film formed from any of the inventive polyethylene-based compositions as described herein. In some embodiments, the film is a monolayer film. In some further embodiments, the monolayer film exhibits a coefficient of friction against itself and metal of less than 0.40.

The film, in some embodiments, is a multilayer film. In some embodiments, the multilayer film comprises a sealant layer, and the sealant layer comprises any of the inventive polyethylene-based compositions as described herein. In some further embodiments, the sealant layer exhibits a coefficient of friction against itself and metal of less than 0.40.

The monolayer films and the sealant layer of multilayer films incorporating the inventive polyethylene-based compositions described herein advantageously exhibit a relatively low coefficient of friction against itself and metal, and low bubble blocking. In some embodiments, a monolayer film incorporating one or more of the inventive polyethylene-based compositions described herein exhibits a coefficient of friction against itself and metal of less than 0.40. In some embodiments, a sealant layer of a multilayer film incorporating one or more of the inventive polyethylene-based compositions described herein exhibits a coefficient of friction against itself and metal of less than 0.40. The coefficient of friction of the monolayer film against metal, and of the sealant layer against itself and metal is measured according to ASTM D1894.

Films of the present invention can have a variety of thicknesses. The thickness of the film can depend on a number of factors including, for example, whether the film is a monolayer or multilayer film, the other layers in the film if it is a multilayer film, the desired properties of the film, the end use application of the film, the equipment available to manufacture the film, and others. In some embodiments, a film of the present invention has a thickness of up to 10 mils. For example, the blown film can have a thickness from a lower limit of 0.25 mils, 0.5 mils, 0.7 mils, 1.0 mil, 1.75 mils, or 2.0 mils to an upper limit of 4.0 mils, 6.0 mils, 8.0 mils, or 10 mils.

In embodiments where the film comprises a multilayer film, the number of layers in the film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, 11, 12, 13, 14, or 15 layers in various embodiments.

In multilayer films, the inventive polyethylene-based compositions perform well in an outer layer of the film, such as a sealant layer, due to good heat seal properties, low bubble blocking and/or low coefficient of friction. The inventive polyethylene-based composition, in some embodiments, can be used in more than one layer of the film. Other layers within a multilayer film of the present invention can comprise, in various embodiments, a polymer selected from the following: the inventive polyethylene-based composition, a LLDPE, a VLDPE (a very low density polyethylene), a MDPE, a LDPE, a HDPE, a HMWHDPE (a high molecular weight HDPE), a propylene-based polymer, a polyethylene plastomer/elastomer, an enhanced polyethylenes, an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present invention has a layer comprising polyamide or ethylene vinyl alcohol. In some embodiments, a multilayer film of the present invention can comprise one or more tie layers known to those of skill in the art.

In some embodiments, the multilayer film has a coating on an outer surface. In general, the coating can be any coating known to those of skilled in the art based on the teachings herein in view of the desired use and properties of the multilayer film. In some embodiments, the coating comprises polyurethane. In various embodiments where a coating is provided on the multilayer film, the coating may have a thickness of less than or equal to 25 microns, such as less than or equal to 20 microns, less than or equal to 15 microns, less than or equal to 10 microns, less than or equal to 5 microns, or even less than or equal to 3 microns. For example, the coating may have a thickness of from 1 micron to 3 microns or from 2 microns to 3 microns. According to additional embodiments, the coating may be applied to the multilayer film 110 at a weight of from 1 gsm (grams per square meter) to 3 gsm, such as from 1 gsm to 2 gsm, or from 2 gsm to 3 gsm using techniques known those of ordinary skill in the art based on the teachings herein.

In some embodiments, depending for example on the end use application, the multilayer film can be corona treated, plasma treated, or printed using techniques known to those of skill in the art. In some embodiments, the multilayer film can be surface coated with polyvinyl alcohol or with aluminum, silicon oxide, aluminum oxide, or other metals known to those having ordinary skill in the art based on the teachings herein.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents. In some embodiments, the polyethylene-based composition comprises up to 3 weight percent of such additional additives. All individual values and subranges from 0 to 3 wt % are included and disclosed herein; for example, the total amount of additives in the polymer blend can be from a lower limit of 0.5, 1, 1.5, 2, 2.5, 3, 3.5, 4, or 4.5 wt % to an upper limit of 1, 2, 3, 4, or 5 wt %.

By being polyethylene-based, the inventive polyethylene-based compositions, according to some embodiments of the present invention, can be incorporated into multilayer films and articles that are comprised primarily, if not substantially or entirely, of polyolefins in order to provide a film and articles that are more easily recyclable. The polyethylene-based compositions of the present invention are particularly advantageous in providing films wherein the film is formed primarily from polyolefins such as polyethylene and/or polypropylene. For example, a film comprising primarily polyethylene or polypropylene has an improved recyclability profile in addition to other advantages that the usage of such polymers may provide. In some embodiments, the film comprises 95 weight percent or more polyethylene based on the total weight of the film. In other embodiments, the film comprises 96 weight percent or more, 97 weight percent or more, 98 weight percent or more, or 99 weight percent or more polyethylene based on the total weight of the film.

Films of the present invention can be formed using techniques known to those of skill in the art based on the teachings herein. For example, the films can be prepared as blown films (e.g., water quenched blown films) or cast films. For example, in the case of multilayer polyethylene films, for those layers that can be coextruded, such layers can be coextruded as blown films or cast films using techniques known to those of skill in the art based on the teachings herein.

In some embodiments, films of the present invention are oriented. In various embodiments, a film can be uniaxially oriented, biaxially oriented, or otherwise oriented using techniques known to those having ordinary skill in the art, such as those described in Briel, J., "Biaxial Oriented Film Technology"), *Film Processing Advances*, Kanai et. al. (editors) (2014). For example, in some embodiments, the film can be oriented using blown film machine direction orientation processes, blown film biaxial orientation processes, double bubble orientation processes, and other techniques known to those of skill in the art based on the teachings herein. One advantage of some embodiments of the present invention, wherein the inventive polyethylene-based compositions are incorporated into films to be oriented, is that the inventive compositions can reduce blocking in the oriented films.

In some embodiments where the film is biaxially oriented, the polyethylene film is biaxially oriented using a tenter frame sequential biaxial orientation process. Such techniques are generally known to those of skill in the art. In general, with a tenter frame sequential biaxial orientation process, the tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenter frame hot air oven with heating zones to carry out stretching in the cross direction. The first several zones are for pre-heating, followed by zones for stretching, and then the last zones for annealing.

In some embodiments, the polyethylene film can be oriented in the machine direction at a draw ratio of 2:1 to 9:1, or in the alternative, at a draw ratio of 2:1 to 6:1, or in the alternative, at a draw ratio of 4:1 to 6:1. The polyethylene film, in some embodiments, can be oriented in the cross direction at a draw ratio of 2:1 to 11:1, or in the alternative, at a draw ratio of 2:1 to 9:1, or in the alternative, at a draw ratio of 6:1 to 9:1. In some embodiments, the polyethylene film is oriented in the machine direction at a draw ratio of 2:1 to 9:1 and in the cross direction at a draw ratio of 2:1 to 11:1. The polyethylene film, in some embodiments, is oriented in the machine direction at a draw ratio of 2:1 to 6:1 and in the cross direction at a draw ratio of 2:1 to 9:1. In some embodiments, the polyethylene film is oriented in the machine direction at a draw ratio of 4:1 to 6:1 and in the cross direction at a draw ratio of 6:1 to 9:1.

After orientation, the biaxially oriented film has a thickness of 5 to 50 microns in some embodiments. In some embodiments, the biaxially oriented film has a thickness of 15 to 40 microns.

In some embodiments when the film is uniaxially oriented, the film is oriented in the machine direction only. Various processing parameters are considered suitable for stretching in the machine direction as known to those having ordinary skill in the art based on the teachings herein. For example, the uniaxially oriented, multilayer film may be oriented in the machine direction at a draw ratio greater than 1:1 and less than 8:1, or at a draw ratio from 4:1 to 8:1.

After orientation, the machine direction oriented film has a thickness of 5 to 50 microns in some embodiments. In some embodiments, the machine direction oriented film has a thickness of 15 to 40 microns.

In some embodiments, depending for example on the end use application, the oriented polyethylene film can be corona treated, plasma treated, or printed using techniques known to those of skill in the art. In some embodiments, the oriented multilayer film can be surface coated with polyvinyl alcohol, or with aluminum, silicon oxide, aluminum oxide, or other metals known to those having ordinary skill in the art based on the teachings herein.

Laminates

Embodiments of the present invention also comprise laminates incorporating films of the present invention comprising one or more of the inventive polyethylene-based compositions. In such embodiments, a film comprising such inventive polyethylene-based composition is laminated to a second film. In general, the second film can be any film known to those having ordinary skill in the art based on the teachings herein. The second film can be selected, for example, based on the properties of the first film comprising the inventive polyethylene-based composition, based on the desired properties of the laminate, based on the intended use of the laminate, and other factors. In some embodiments, the second film also comprises an inventive polyethylene-based composition. In some embodiments, the first film and the second film have the same or substantially the same composition and structure.

In some embodiments, the laminate comprising a multilayer film having a sealant layer, the sealant layer comprises the inventive polyethylene-based composition, and the sealant layer is an outer layer of the laminate. In some embodiments, the sealant layer exhibits a coefficient of friction against metal of less than 0.50. In some such embodiments, the second film of the laminate is a sealant film, a biaxially oriented monolayer film, a biaxially oriented multilayer film, a monolayer film oriented in the machine direction, or a second multilayer film oriented in the machine direction. In some further embodiments, the second film comprises at least 95% by weight, based on the total weight of the second film, of one or more polyethylenes.

In some embodiments, the second film is a monolayer film, a multilayer film, an oriented monolayer film, a biaxially oriented multilayer film, or a multilayer film oriented in the machine direction. In some embodiments, the second film comprises at least 95% by weight of one or more polyethylenes, or at least 98% by weight of one or more polyethylenes in other embodiments, or at least 99% by weight of one or more polyethylenes in other embodiments, each based on the total weight of the second film.

In some embodiments, the second film is a sealant film. For example, the second film can be a polyethylene sealant film that is a monolayer or multilayer film formed substantially from polyethylene (e.g., comprises greater than 90 weight percent ethylene-based polymers, or greater than 95 weight percent ethylene-based polymers, or greater than 99 weight percent ethylene-based properties) and that when heated as part of the laminate structure can seal the laminate to another film, to another laminate, or to itself. Any polyethylene sealant film known to those of ordinary skill in the art based on the teachings herein may be used.

A wide variety of biaxially oriented multilayer films or uniaxially oriented films known to those of ordinary skill in the art can be used as the second film in various embodiments of laminates based on the teachings herein and based on the desired properties of the laminate.

The second film in some embodiments comprises polyethylene, polyethylene terephthalate, polypropylene, or polyamide. When the second film comprises polyethylene, polyethylene terephthalate, polypropylene, or polyamide, the entire film may be formed from polyethylene, polyethylene terephthalate, polypropylene, or polyamide, or the film comprises at least one layer that includes polyethylene, polyethylene terephthalate, polypropylene, or polyamide. Persons having ordinary skill in the art can select films that comprise polyethylene, polyethylene terephthalate, polypropylene, or polyamide for use in such embodiments based on the teachings herein.

In some embodiments, laminates of the present invention comprise a third film (e.g., a triplex laminate). In such embodiments, at least one outer layer of the laminate is a sealant layer comprising an inventive polyethylene-based composition. In various embodiments, the third film can be any of the first or second films disclosed herein. For example, in some embodiments, the laminate comprises a machine-direction oriented polyethylene film as an outer film, a biaxially oriented polyethylene film as an inner film, and a multilayer layer polyethylene film as the other outer film, wherein the multilayer film includes an inventive polyethylene-based composition in its outer layer.

Laminates according to embodiments of the present invention can be formed using techniques known to those having ordinary skill in the art based on the teachings herein. For example, an inventive film (comprising any of the inventive polyethylene-based compositions disclosed herein) can be laminated to the other film using an adhesive. Various adhesive compositions are considered suitable for the adhesives used to make a laminate. These may include polyurethane, epoxy, acrylic, or the like. In one embodiment, the laminate may comprise adhesive layers comprising polyurethane adhesive. The polyurethane adhesive may be solventless, waterborne or solvent based. Furthermore, the polyurethane adhesive may be a two part formulation. The weight or thickness of the adhesive layer can depend on a number of factors including, for example, the desired thickness of the multilayer structure, the type of adhesive used, and other factors. In some embodiments, the adhesive layer is applied at up to 5.0 grams/m$^2$, or from 1.0 to 4.0 g/m$^2$, or from 2.0 to 3.0 g/m$^2$.

Laminates according to some embodiments of the present invention can also be formed by extrusion lamination.

Laminates according to some embodiments of the present invention have coefficient of friction of the first film side against metal of less than 0.50.

Articles

Embodiments of the present invention also relate to articles, such as packages, formed from or incorporating one or more inventive films of the present invention (or from laminates incorporating such films). Such packages can be formed from any of the inventive films or laminates described herein.

Examples of such articles can include flexible packages, pouches, stand-up pouches, and pre-made packages or pouches. In some embodiments, oriented, multilayer polyethylene films or laminates of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

Test Methods

Unless otherwise indicated herein, the following analytical methods are used in describing aspects of the present invention:

Melt Index

Melt indices $I_2$ (or I2) and $I_{10}$ (or I10) are measured in accordance to ASTM D-1238 (method B) at 190° C. and at 2.16 kg and 10 kg load, respectively. Their values are reported in g/10 min Density Samples for density measurement are prepared according to ASTM D4703. Measurements were made, according to ASTM D792, Method B, within one hour of sample pressing.

Coefficient of Friction

Coefficient of Friction (COF) is measured according to ASTM D1894. Testing is carried out using an INSTRON 5564 Universal Testing Machine. A specimen of a film sample is cut to 3 inch×6 inch. A B-type sled is used, which is a 2.5 inch×2.5 inch square and weighs 195 g. The sample is wrapped snugly around the sled with the machine direction (MD) aligned parallel to the direction of movement. This is aided by the use of double-sided tapes pre-attached onto the top face of the sled. It is ensured that there are no wrinkles on the film surface to be tested. A COF measurement fixture which consists of a rigid plate with a low-friction pulley is attached to the fixed base of the equipment. A metal plate is then placed on top of the aforementioned rigid plate and is used subsequently as the plane on which is the sled is to be driven. If film to film COF is to be tested, then another piece of the film approximately 6"×14" is attached to the metal plane with the surface of interest facing up and with the long side in the machine direction. The sled with the film specimen attached is then placed on the metal plane/sample-covered plane and attached to the nylon tow line, which goes around the pulley and attaches to the crosshead of the test frame. The crosshead is then driven at a speed of 6 inch/min for a distance of 3 inch. The force at which the sample starts to move (initial peak in the load-displacement data) is the static force ($F_S$). The average load calculated between 0.5 inch and 3 inch of movement is the kinetic force ($F_K$). The kinetic COF, $\mu_K$, is the ratio of the kinetic force ($F_K$) to the normal force (weight of the sled). Five replicates are run for each sample and the average value is reported.

Blocking Force

Blocking force is highly dependent on the thermal history of the films. So, films are maintained at 25±2° C. prior to measurements. 6 inches×1 inch strips are punched out of a collapsed bubble of the films with the longer dimension being along the machine direction. The two layers are separated at one edge. The layers are clamped in the grips of an Instron frame (initial grip separation=1 inch) and pulled apart at the rate of 1 inch/min (180° peel). The test is continued until an additional 4 inches of the layers have been separated. The force-displacement curve is recorded during the test. The force rapidly increases initially and then plateaus. The plateau force is a measure of the blocking force. The most frequent value of force in the plateau region (Mode) is taken as the blocking force. At least five specimens are tested from a film sample. The highest and lowest measurements from the tested samples are discarded, and the mean of the remaining is reported.

GPC-Triple Detector (PDMS Mw and Mn Measurement)

Weight average molecular weight (Mw) and number average molecular weight (Mn) of the polydimethylsiloxane are measured by GPC (Viscotek™ GPC Max) using a triple detection capability. The Viscotek™ TDA305 unit is equipped with a differential refractometer, an online differential pressure viscometer, and low angle light scattering (LALS: 7° and 90° angles of detection). The mobile phase is Toluene HPLC grade. The columns are two PL Gel Mixed C from Varian—(7.5*300 mm, 5 μm particle size) and a PL Gel Guard column from Varian—(7.5*300 mm) 5 fractom Injection volume with a flow of 1 mL/min and a run time of 37 min. The column and detector temperature is 40° C. The software used is Omnisec 4.6.1 (Viscotek™).

The detectors are calibrated by injection of a narrow polystyrene standard (Mw 68,100 g/mol) of a known concentration. Correct run parameters are checked by using a narrow molecular weight distribution polystyrene standard (PS71K). The molecular weight averages must be within the Statistical Process Control (SPC) chart in order to validate the detectors calibration. A dn/dc of 0.083 is used for the triple detection calculations. Typical $GPC^3$ precision and accuracy (which depends on the refractive index increment) are around 2-3%.

Some embodiments of the invention will now be described in detail in the following Examples.

EXAMPLES

Inventive Examples 1-3 and Comparative Examples A-C

Three inventive and three comparative multilayer film are prepared using a LabTech five-layer coextrusion blown film line. Each multilayer film is a two layer film having a structure of A/B. The blown film line is equipped with an annular die having a diameter of 75 mm and a die gap of 2 mm. The blow up ratio (BUR) is 3.0:1. The output rate is 18.1 kg/hr with a specific rate of 76.9 kg/hr/m die. The bubble had a nominal width of 353 mm and a nominal thickness of 50 μm. The melt temperature is between 230 and 255° C. The outer surface of the bubble (surface of the A layer) is corona treated to achieve surface energy >42 mN/m. About 6 m of bubble is collected initially by hand for blocking force measurement. Then, the bubble is slit to 305 mm width and separated. About 70 m of the slit film is collected on a roll for subsequent lamination.

The multilayer films are laminated to 12 μm thick biaxially oriented polyethylene terephthalate (BOPET) on a Nordmeccanica Labo Combi laminator using MOR-FREE™ L75-197/C-5 solventless adhesive. L75-197 and C-5 are mixed in the ratio of 100:80. Both PE and PET surfaces are corona treated. The adhesive is applied using a Gravure roll at surface density of 0.9-1.2 lb/ream, and subsequently nipped at 55° C. Curing is done at 25° C. and 50% relative humidity for at least 7 days.

The structures of Inventive Films 1-3 and Comparative Films A-C are shown in Table 1 with the amount of the components in each layer provided as a weight percentage of the total weight of the layer.

TABLE 1

|  | Layer A (Skin Layer) (40 μm) | Layer B (Sealant Layer) (10 μm) |
|---|---|---|
| Comp. Film A | 80% DOWLEX™ 2045G 20% DOW™ LDPE 611A | AFFINITY™ PL 1880G 2250 ppm erucamide 2250 ppm behenamide 3200 ppm talc |
| Comp. Film B | 80% DOWLEX™ 2045G 20% DOW™ LDPE 611A | AFFINITY™ PL 1880G 3000 ppm erucamide 1500 ppm PDMS 1 3200 ppm talc |
| Comp. Film C | 80% DOWLEX™ 2045G 20% DOW™ LDPE 611A | AFFINITY™ PL 1880G 3000 ppm behenamide 1500 ppm PDMS 1 3200 ppm talc |
| Inv. Film 1 | 80% DOWLEX™ 2045G 20% DOW™ LDPE 611A | AFFINITY™ PL 1880G 1500 ppm erucamide 1500 ppm behenamide 1500 ppm PDMS 1 3200 ppm talc |

TABLE 1-continued

|  | Layer A<br>(Skin Layer)<br>(40 μm) | Layer B<br>(Sealant Layer)<br>(10 μm) |
|---|---|---|
| Inv. Film 2 | 80% DOWLEX ™ 2045G<br>20% DOW ™ LDPE 611A | AFFINITY ™ PL 1880G<br>1500 ppm PDMS 2<br>3200 ppm talc |
| Inv. Film 3 | 80% DOWLEX ™ 2045G<br>20% DOW ™ LDPE 611A | AFFINITY ™ PL 1880G<br>4500 ppm PDMS 1<br>3200 ppm talc |

DOWLEX™ 2045G is a linear low density polyethylene having a density of 0.920 g/cm³ and a melt index ($I_2$) of 1.0 g/10 minutes commercially available from The Dow Chemical Company. DOW™ LDPE 611A is a low density polyethylene having a density of 0.924 g/cm³ and a melt index ($I_2$) of 0.88 g/10 minutes commercially available from The Dow Chemical Company. AFFINITY™ PL 1880G is a polyethylene plastomer having a density of 0.902 g/cm³ and a melt index ($I_2$) of 1.0 g/10 minutes commercially available from The Dow Chemical Company. Erucamide and behenamide are commercially available from Croda International Plc as Crodamide™ ER and Crodamide™ BR, respectively. Talc is commercially available from IMIFABI as HTP1C. PDMS 1 and PDMS 2 are polydimethylsiloxanes commercially available from The Dow Chemical Company as XIAMETER™ PMX-200 Silicone Fluid 100 cst and XIAMETER™ PMX-200 Silicone Fluid 10 cst, respectively. The properties of PDMS 1 and PDMS 2 are described in Table 2.

TABLE 2

|  | Number average molecular weight (Mn, g/mol) | Weight average molecular weight (Mw, g/mol) | Polydispersity Index (PDI) |
|---|---|---|---|
| PDMS 1 | 6,080 | 9,400 | 1.55 |
| PDMS 2 | 1,110 | 1,470 | 1.32 |

Individual masterbatches of erucamide, behenamide, PDMS 1, and PDMS 2 are made in DOWLEX™ 2047 G linear low density polyethylene (density=0.917 g/cm³ and melt index ($I_2$)=2.3 g/10 minutes) at concentrations of 5-10 wt % using a twin screw extruder. DOWLEX™ 2047 G is commercially available from The Dow Chemical Company. For the sealant layer (Layer B), it should be understood that the amount of additives are specified in parts per million on a weight basis and the balance of the layer is AFFINITY™ PL 1880G. The additives are incorporated in AFFINITY™ PL 1880G by melt blending the desired additives masterbatches at appropriate concentrations.

The blocking force of each film is also measured as described above in the Test Methods section.

The Inventive Film and the Comparative Films differ only in the additives used in the sealant layer (Layer B). The sealant-to-metal coefficient of friction of the sealant layer is measured by measuring the coefficient of friction when the sealant layer of the fil sample (e.g., a first film sample of Inventive Film 1) is placed in contact with a metal surface as described above in the Test Methods section. The sealant-to-sealant coefficient of friction of the sealant layer is evaluated by measuring the coefficient of friction when the sealant layer of one film sample (e.g., a first film sample of Inventive Film 1) is placed in contact with the sealant layer of another film sample having the same composition (e.g., a second film sample of Inventive Film 1) as described above in the Test Methods section.

Next, the coefficient of friction of the sealant layer after lamination is measured as described in the Test Methods section above. The sealant-to-metal coefficient of friction of the sealant layer after lamination is measured by measuring the coefficient of friction when the sealant layer of the laminate sample (e.g., a first laminate sample of Inventive Film 1) is placed in contact with a metal surface. The sealant-to-sealant coefficient of friction of the sealant layer after lamination is evaluated by measuring the coefficient of friction when the sealant layer of one film sample (e.g., a first laminate sample of Inventive Film 1) is placed in contact with the sealant layer of another film sample having the same composition (e.g., a second laminate sample of Inventive Film 1).

The results are provided in Table 3.

TABLE 3

|  | Blocking force (mN/25.4 mm) | Sealant-to-metal COF after lamination |
|---|---|---|
| Inv. Film 1 | 10.3 | 0.37 |
| Inv. Film 2 | <10 | 0.48 |
| Inv. Film 3 | 13.2 | 0.37 |
| Comp. Film A | 11.6 | 0.47 |
| Comp. Film B | 11.7 | 0.27 |
| Comp. Film C | 14.1 | 0.29 |

Each of the Inventive and Comparative Films contain the same amount of talc (3200 ppm), but differ in the other additives added to them. Consequently, the difference in their performance is attributed to the other additives and subsequently only the other additives will be described. Inventive Film 2 contains only 1500 ppm PDMS of $M_n$ less than 2500 g/mol. Inventive Film 1 contains 1500 ppm PDMS of $M_n \approx 6000$ g/mol together with 1500 ppm each of an unsaturated fatty acid amide (erucamide) and a linear saturated fatty acid amide (behenamide). Comparative Film A contains 2250 ppm each of erucamide and behenamide. Despite having the same total amount of additives as Inventive Film 1 (7700 ppm) and substantially higher amount of additives (3000 ppm higher) than Inventive Film 2, Comparative Film A exhibits higher blocking force than both Inventive Films Comparative Films B and C contain the same PDMS and at the same loading as Inventive Film 2. However, instead of using a combination of unsaturated and linear saturated fatty acid amides, they only use one— unsaturated fatty acid amide (erucamide) in Comparative Film B and linear saturated fatty acid amide (behenamide) in Comparative Film C. Note that just like PDMS, the total loading of the amides in Comparative Films B and C is the same as in Inventive Film 1. Despite the same PDMS loading (1500 ppm) as Inventive Films 1 and 2 and same or higher total amide content as Inventive Films 1 and 2, Comparatives Films B and C show higher blocking than Inventive Films 1 and 2.

It should be noted that although the blocking force differences in Table 3 between some Inventive and Comparative Films are not very high, they translate into significant differences in the maximum output rate possible during blown film fabrication when this is limited due to bubble blocking. While not wishing to be bound by any particular theory, it is believed that the reduced on-line blocking tendency of the Inventive Films can be related to the fast migration of the additives in the composition to the film surface, impeding intimate contact between the film surfaces. When blocking force is measured sometime after extrusion (off-line), alternative, slower-migrating additive compositions can also help to reduce the blocking force measured even though on-line, the blocking tendency may be observed as being significantly higher.

That which is claimed:

1. A polyethylene-based composition comprising:
   (A) at least 95% by weight, based on the total weight of the polyethylene-based composition, of one or more polyethylenes; and
   (B) 250 to 15,000 ppm, based on the total weight of the polyethylene-based composition, of a polydimethylsiloxane having a number average molecular weight ($M_n$) of 1,000 to 40,000 g/mol;
   wherein the polyethylene-based composition has a density of 0.865 to 0.915 g/cm$^3$ and a melt index ($I_2$) of 0.5 to 25 g/10 minutes wherein the polyethylene-based composition is void of polydimethylsiloxane other than the polydimethylsiloxane having a number average molecular weight ($M_n$) of 1,000 to 40,000 g/mol.

2. The polyethylene-based composition of claim 1, wherein the polydimethylsiloxane has a number average molecular weight ($M_n$) of 1,000 to 25,000 g/mol.

3. The polyethylene-based composition of claim 1, further comprising 250 to 2,500 ppm of erucamide and 250 to 2,500 ppm of behenamide, each based on the total weight of the polyethylene-based composition.

4. The polyethylene-based composition of claim 1, further comprising up to 20,000 ppm of an inorganic antiblocking agent, based on the total weigh of the polyethylene-based composition.

5. The polyethylene-based composition of claim 1, further comprising up to 5,000 ppm of a fatty acid amide selected from the group consisting of stearamide, oleamide, palmitamide, isostearamide, ethylene-bis-oleamide, and ethylene-bis-stearamide and combinations thereof.

6. The polyethylene-based composition of claim 1, wherein the one or more polyethylenes comprise a polyethylene having a density of 0.885 to 0.910 g/cm$^3$ and a melt index ($I_2$) of 0.5 to 25 g/10 minutes.

7. A monolayer film comprising the polyethylene-based composition of claim 1.

8. The monolayer film of claim 7, wherein film exhibits a coefficient of friction against itself and metal of less than 0.40.

9. A laminate comprising the monolayer film of claim 7, wherein the monolayer film side of the laminate exhibits a coefficient of friction against metal of less than 0.50.

10. A multilayer film comprising the polyethylene-based composition of claim 1.

11. The multilayer film of claim 10, wherein a sealant layer of the multilayer film comprises the polyethylene-based composition and wherein the sealant layer exhibits a coefficient of friction against itself of less than 0.40.

12. An oriented multilayer film comprising a sealant layer, wherein the sealant layer comprises the polyethylene-based composition of claim 1.

13. A laminate comprising the multilayer film of claim 10, wherein a sealant layer of the multilayer film comprises the polyethylene-based composition, wherein the sealant layer is an outer layer of the laminate, and wherein the sealant layer of the multilayer film exhibits a coefficient of friction against metal of less than 0.50.

* * * * *